United States Patent [19]

Menke

[11] 4,266,847
[45] May 12, 1981

[54] APPARATUS FOR LINE-SCANNING OF LARGE IMAGE FIELDS

[75] Inventor: Josef F. Menke, Glücksburg, Fed. Rep. of Germany

[73] Assignee: ELEKTRO-OPTIK GmbH & Co. KG, Glücksburg, Fed. Rep. of Germany

[21] Appl. No.: 87,339

[22] Filed: Oct. 23, 1979

Related U.S. Application Data

[63] Continuation-in-part of Ser. No. 968,419, Dec. 11, 1978, abandoned.

[30] Foreign Application Priority Data

Dec. 10, 1977 [DE] Fed. Rep. of Germany ....... 2755094

[51] Int. Cl.³ ............................................. G02B 27/17
[52] U.S. Cl. .................................................... 350/6.6
[58] Field of Search ............................... 350/6.1–6.91; 250/235, 236; 355/66; 358/205, 206

[56] References Cited

U.S. PATENT DOCUMENTS

| | | | |
|---|---|---|---|
| 3,360,659 | 12/1967 | Young | 350/6.7 |
| 3,614,212 | 10/1971 | Hock | 350/6.4 |
| 3,642,343 | 2/1972 | Tchejeyan et al. | 350/6.6 |
| 3,909,104 | 9/1975 | Menke | 350/6.4 |

Primary Examiner—Jon W. Henry
Attorney, Agent, or Firm—Gilbert L. Wells

[57] ABSTRACT

The optics of the present invention are used for the cartesian scanning and reproduction of large image fields.

The optics have at least two roof prisms oscillating to and fro perpendicularly to the direction of their roof edges, for the purpose of writing the length of the image line and a conventional optical means is provided behind the roof prism, as seen in the direction of the incident light, for writing the small image angle ( =image height).

6 Claims, 5 Drawing Figures

APPARATUS FOR LINE-SCANNING OF LARGE IMAGE FIELDS

CROSS-REFERENCES TO RELATED APPLICATIONS

The present application is a continuation-in-part of application Ser. No. 968,419, filed Dec. 11, 1978 now abandoned.

Applicant claims priority under 35 USC 119 for application P No. 27 55 094.3, filed Dec. 10, 1977 in the Patent Office of the Federal Republic of Germany.

BACKGROUND OF THE INVENTION

The present invention relates to optics in apparatus capable of cartesian scanning and transmitting of large image fields, for instance, larger than 2°×5°.

It is known to use oscillating mirrors, rotating polygons, rotating triple mirrors and also combinations of these components for the purpose of obtaining cartesian raster images in scanning apparatus. The scanning systems provided with these components, however, suffer from a series of imaging defects which substantially degrade the image quality. Thus, oscillating mirrors for instance move the aperture and accordingly prevent optimal adaptation of the detector by FOV (field of view) limitation.

Rotating refracting polygons generate transverse comae at large image angles.

Mirror polygons suffer from the same drawback as the oscillating mirrors, namely they move the aperture and therefore require a very large detector aperture.

Rotating triple reflectors do not generate a linear raster.

SUMMARY OF THE INVENTION

Having in mind the limitations of the prior art imaging defects outlined above, it is an object of the present invention to create a scanning system eliminating these imaging defects.

This object is achieved in the present invention by
(a) providing a conventional optical means such as a rotating prism for scanning one coordinate direction of the image field;
(b) providing at least two swinging roof prisms of which the roof edges extend in parallel for scanning the other coordinate direction;
(c) having the roof prisms swing oppositely to one another in the direction of their hypotenuses;
(d) having the direction of swing extending perpendicularly to the roof edges; and
(e) having the roof prisms mounted on slides which are so interlinked mechanically that they execute motions in opposite directions so that besides the optical effect a mass compensation is achieved.

The essential concept of the present invention thus resides in using at least two displaceable roof prisms for scanning the lines, i.e., the long coordinate direction of the image (as opposed to the height of the image, which would be the short coordinate direction).

This system has several advantages. First of all, even a relatively small amplitude of the swinging motion results in a long line being scanned, since each roof prism used doubles the length of the scanned line.

With the two roof prisms being used a stroke length of A will result in a line length of 4 times A.

The length of the optical path through the roof prisms always remains constant so that neither a curvature of the image field nor an aperture error occurs.

The whole apparatus operates vibration-free since the subassembly of each roof prism is swung in a direction opposite to the other roof prism subassembly and therefore makes an exact mass compensation possible. This system scanning the large or long axis then must be further combined with another system to generate the small or short axis. To that end, use is made for instance, of a polygonal prism which is inserted behind the objective lens and the first roof prism. As mentioned in the Background of the Invention, the image generated will indeed show image distortions when the image field is being scanned by a rotating polygonal prism. However, this will not show if only the short coordinate is scanned by the rotating prism which covers only the small image angle.

In order not to shift the focus of the converging beam bundle passing through the roof prisms, they must be moved so that the main beam (central beam) emerging from the prisms is always displaced parallel to itself, i.e., the hypotenuses of the prisms must be moved perpendicularly to the main beam. This is achieved with any suitable displacement device. It is, however, particularly advantageous to mount the roof prisms on slides and to interlink the slides mechanically so that they are positively guided for movement in directions opposite to one another.

The movement of the roof prisms is such that the diagram of the movement is approximately triangularly shaped.

It is further advantageous to use electromagnetic forces to achieve this triangular movement where the slides are mechanically connected to the means for generating these forces.

The slides are moved by electromagnetic forces from their rest position and springs are employed to push the slides back to the rest position.

Such an apparatus results in a sine shaped diagram of the prism movement. The triangular shape of the diagram is achieved by a buffer means against which the slides abut just prior to reaching the turning point of their movement.

The optical elements of the scanning apparatus are preferably roof prisms, however, roof mirrors may readily be used instead. An even number or an odd number of such roof prisms or roof mirrors respectively are useful. When an even number is used, mass compensation is achieved automatically during the movement, and when an odd number is used, a counterweight has to be mounted on one slide.

When it is desired to process two wavelength ranges by means of this scanning system—which might be the case for instance when receiving in the 10 micron wavelength range, while the reproduction takes place in the visible range from 520 to 670 nanometer—then corresponding reflecting optical components must be selected. The pentaprism is replaced by a roof-mirror and the refracting polygon consisting of silicon or germanium is replaced by a mirrorized polygon, to correspond to the optical components evidencing lens effects.

BRIEF DESCRIPTION OF THE DRAWINGS

The present invention is illustrated by several embodiments shown in the drawings, wherein.

DESCRIPTION OF THE PREFERRED EMBODIMENTS

Figure 1:
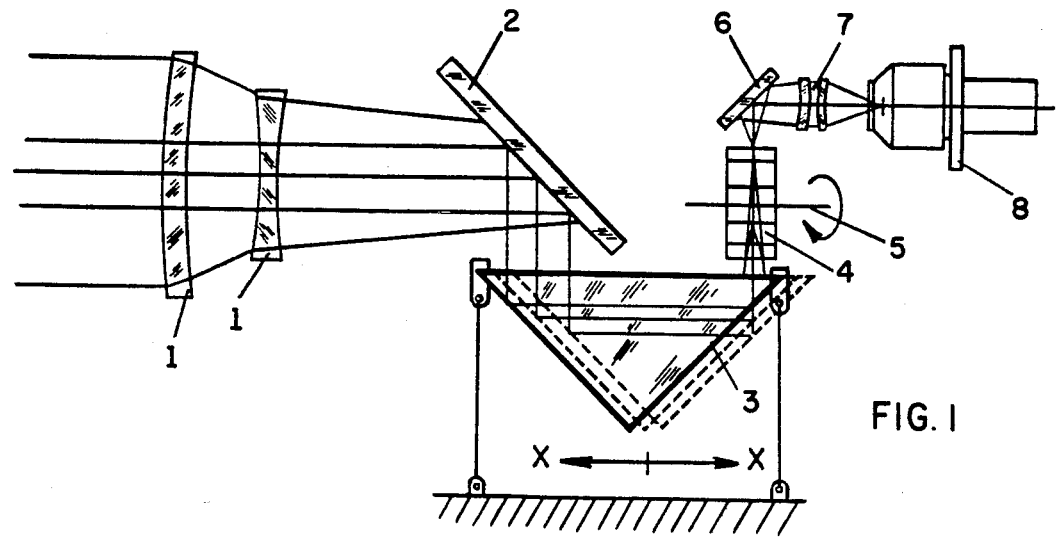
FIG. 1 is a diagrammatic view of the scanning system of the present invention with refracting components.

With particular reference to FIG. 1, entrance objective 1 is followed along the direction of the incident light by a deflecting mirror 2 and a roof prism 3.

A refracting polygon 4, located above the base of roof prism 3, is rotatably mounted about an axis 5 which is parallel to the base of the roof prism.

A further deflecting mirror 6, an intermediary lens 7 with a detector 8 in its focal plane, are mounted behind polygon 4.

The light passing through the entrance objective 1 by means of deflecting mirror 2 arrives at the roof prism 3. Roof prism 3 is displaceable in the direction of the double arrow X by means of a drive system not shown in the drawing. Therefore, the main ray exiting from the roof prism is offset by twice the prism displacement parallel to itself. When the prism displacement for instance is 4 mm, the main ray will be offset laterally by 8 mm. In this fashion, the writing of the large axis, i.e., the length of the line, takes place.

The focus of the entrance objective 1 is so located in polygon 4 as to coincide with the focus on the object side of the intermediary lens 7. When polygon 4 is rotated about its axis 5, the main ray therefore is deflected into a direction which is perpendicular to that of the double arrow X. Accordingly, the y-direction is written in the image field of the image to be scanned.

Accordingly, the scanning of the image height and its small image angle is performed by the polygon and no image defects occur. As regards scanning the large image angle, that is the image width or the length of the line, use is made of the roof prism and since the image angle in this direction is practically unlimited, no imaging defects take place even at large image angles.

Figure 2:
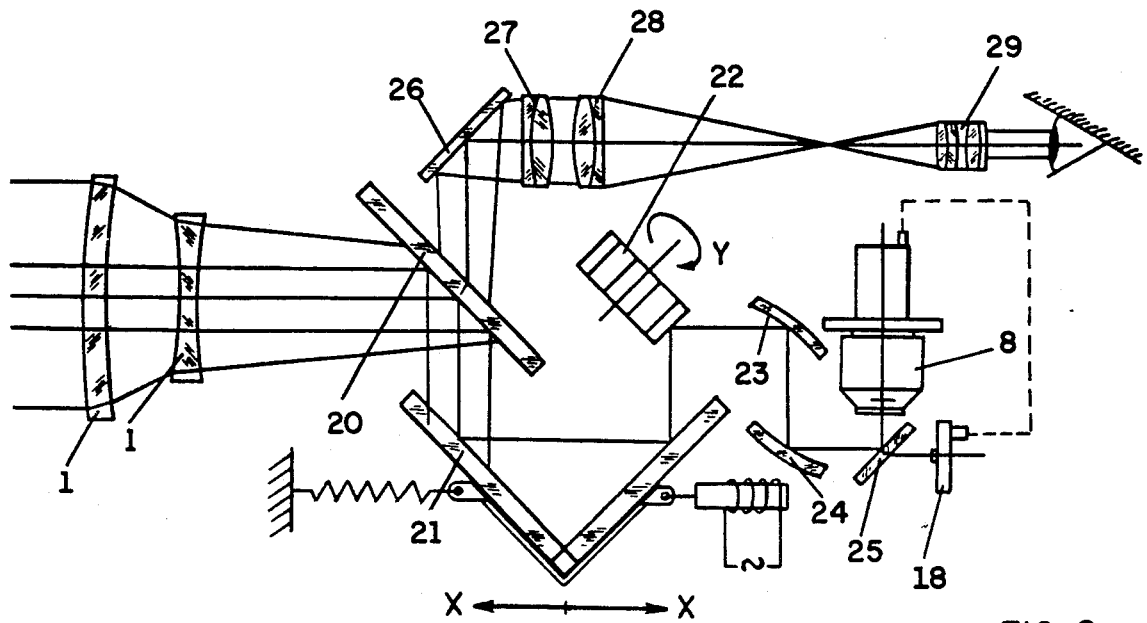
FIG. 2 is a system of the same type as FIG. 1, but with reflecting components, this system being suitable for operating in two different ranges of wavelength.

FIG. 2 shows a system which is the same in principle as the system shown in FIG. 1; however, both the roof prism and the polygon are designed as specular components in this embodiment. Therefore, this system is suitable for operating in at least two ranges of wavelengths. The system receives in a range of long wavelengths, for instance of 10 microns, while reproduction takes place in the visible range.

Again, there is an entrance objective 1, followed, however, by a dichroically specular mirror beam-splitter 20 acting as deflecting mirror. This beamsplitter is followed in the direction of the incident light by a 90° mirror 21 and by a surface-reflecting polygon 22. Two concave mirrors 23,24 acting as focusing means are located behind the polygon. A dichroic beam splitting mirror 25 is followed by detector 8 and an LED arrangement 18 which are mutually orthogonal, the LED's being controlled by the detector by means of an amplifier chain shown in dashed lines.

A further deflecting mirror 26 and a collimating lens 27 are shown mounted above the beam splitting mirror 20. The collimator is followed by a telescope consisting of objective 28 and ocular 29.

In the embodiment of FIG. 2, the 90° mirror 21 is displaceable in the direction of double arrow X corresponding to the pentaprism 3 of the embodiment of FIG. 1.

The light passes through the entrance objective 1 and the dichroic beam splitting mirror 20 to reach the 90° mirror 21, then the reflecting polygon 22, the concave mirror 23,24 and the dichroic beam splitting mirror 25, and finally it reaches detector 8.

This detector 8 controls the LED set 18 by means of a chain of amplifiers, the light from the LED system moving in the opposite direction and backward as far as the dichroic beam splitting mirror 20. This latter, however, does not reflect the LED light, rather transmits it so it passes via deflecting mirror 26 to collimator 27. The beam is entirely parallel to the axis and enters the telescope 28,29 through which the LED image is observed.

Only one roof prism or one 90° mirror is used in either of the embodiments of FIGS. 1 and 2.

Figure 3:
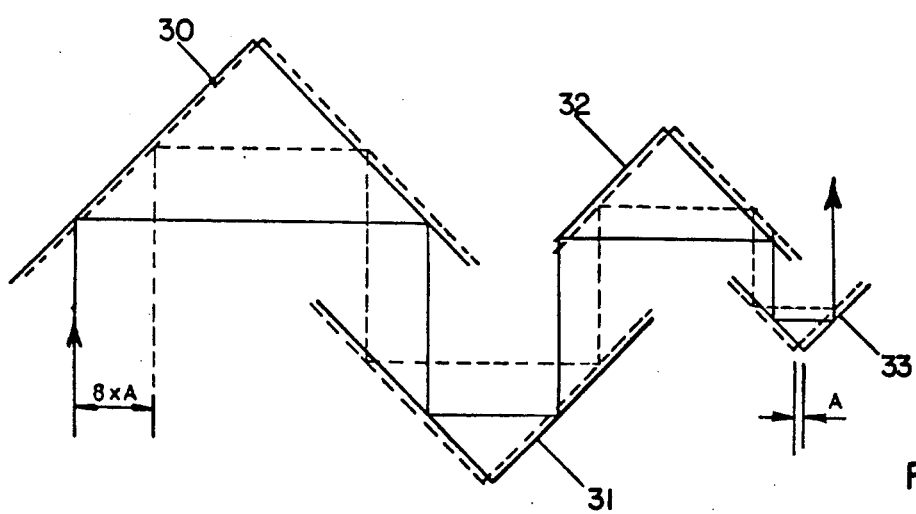
FIG. 3 is a diagrammatic view showing an arrangement of several roof prisms or 90° mirros useful in the present invention.

When the image to be scanned, however, is larger in the direction of its longitudinal axis, then several prisms or 90° mirrors are arranged sequentially without difficulty. Such an arrangement using mirrors is shown in FIG. 3 in a schematic manner. In this embodiment, use is made of 90° mirrors 30,31,32 and 33, which are all displaceable by the same amount A. Because of the sequential arrangement, the entire scanning path therefore adds up to 8 times A.

Figure 4:
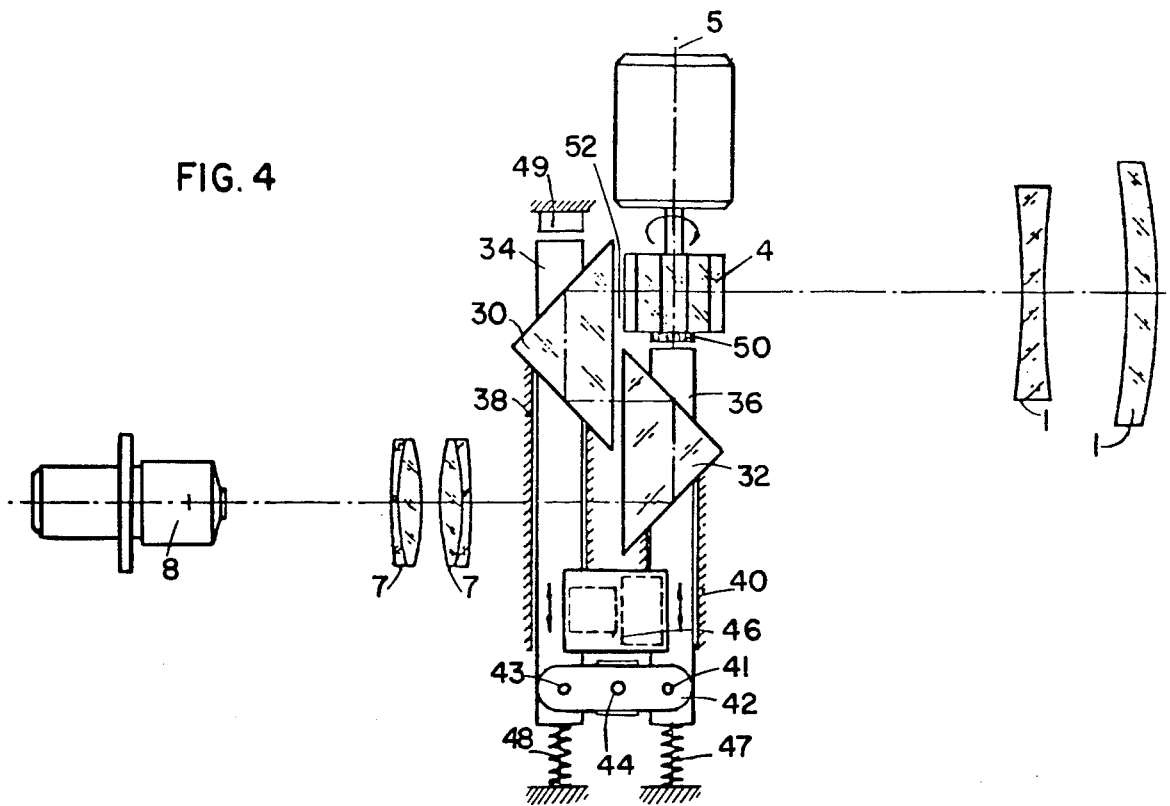
FIG. 4 is a diagrammatic view of an embodiment of the scanning system of FIG. 1 with two roof prisms.

In FIG. 4, as in FIG. 1, the objective lens is designated by the numeral 1. Behind the lens 1 in the direction of beam travel there is mounted a polygonal prism 4. Then follow two roof prisms 30 and 32, and finally a transformation optic 7 and a detector 8.

Roof prisms 30 and 32 are each mounted on one slide each 34 and 36, respectively. The slides are displaceable in guide means 38,40 in the direction of the double-headed arrows. The slides are interlinked by means of lever 42 to execute jointly movements in directions opposite to one another. Lever 42 is pivotably mounted on stationary pin 44 and has equally spaced pins 41 and 43 at the ends of the two arms.

By means of the electromagnetic system 46, springs 47,48 and buffer means 49,50, the desired triangularly shaped diagram of the movement of the slides, and thus of the roof prisms is achieved.

The image plane of the objective lens is designated 52.

Figure 5:
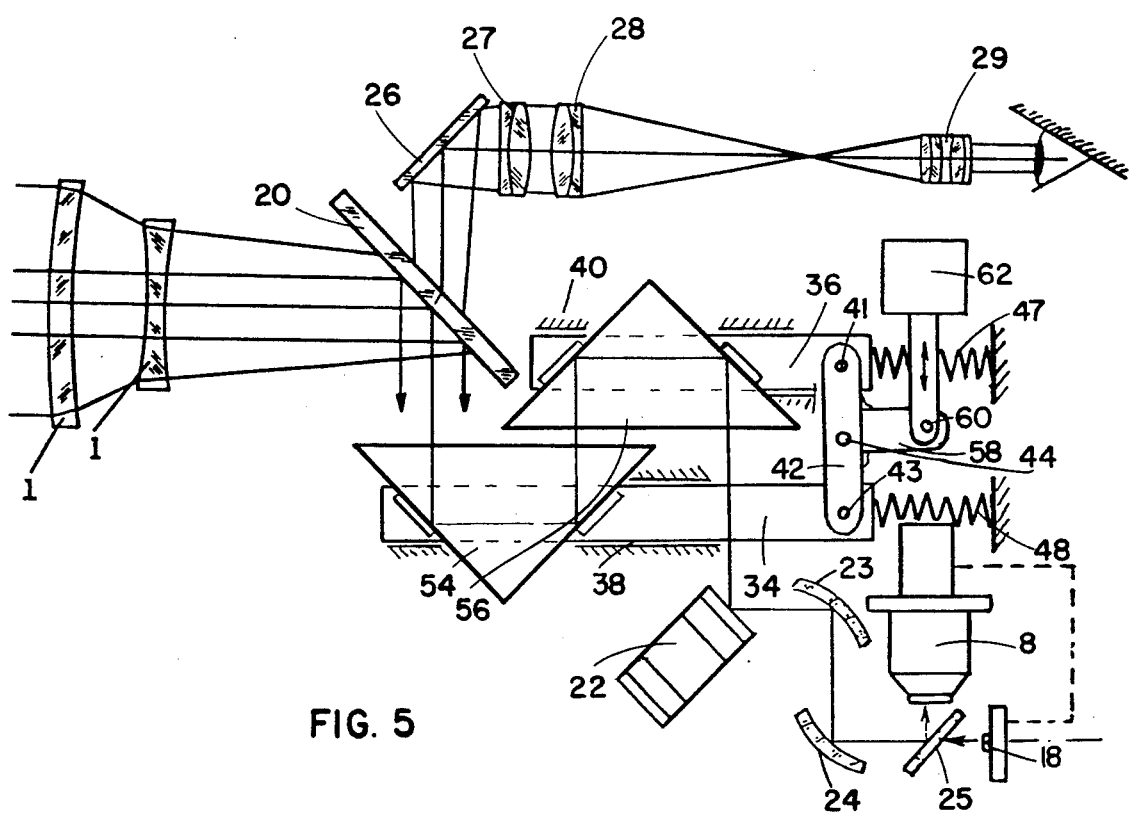
FIG. 5 is a diagrammatic view of an embodiment of the scanning system of FIG. 2 with two roof prisms.

FIG. 5 is a modification of the embodiment of FIG. 2 where like elements have the same numerical designation.

The roof prisms 54 and 56 are mounted on slides 34 and 36, respectively, and the slides are displaceable in guide means 38 and 40.

Lever 42 has a third arm 58 with pivot point 60. Acting on this pivot point 60 is a vibrating magnet 62 which displaces roof prisms 54 and 56.

I claim:

1. In an apparatus for optical line scanning of large image fields comprising in combination a roof mirror for scanning the image field in a first coordinate direction with a conventional optical means for scanning the image field in a second coordinate direction, the improvement comprising:

(a) at least two roof mirrors employed for extending the length of the scanned line;
(b) roof edges of said roof mirrors extending in parallel;
(c) means for oscillating said roof mirrors in a direction perpendicular to the roof edges and in opposite directions to one another in a plane parallel to each respective hypotenuse; and
(d) said roof mirrors mounted on support means having interlinking gear means to execute motion in opposite directions, thereby achieving besides the optical effect a complete weight compensation.

2. The apparatus of claim 1, wherein said roof mirrors are roof prisms.

3. The apparatus of claim 2, wherein said support means are slides and said interlocking gear means is a symmetrical double armed lever to the ends of which one each of said slides is connected.

4. The apparatus of claim 1, wherein said conventional optical means is a rotating prism.

5. The apparatus of claim 3, wherein said slides with said roof prisms are moved from their rest position by electromagnetic means and are returned to their rest position by springs.

6. The apparatus of claim 5, wherein the movement of said slides is stopped by buffer means so that a triangularly shaped motion diagram is achieved.

* * * * *